United States Patent
Shonk

(10) Patent No.: US 11,272,669 B2
(45) Date of Patent: Mar. 15, 2022

(54) DRAPER PICKUP WITH CROP DISTRIBUTION FOR AGRICULTURAL BALER

(71) Applicant: CNH Industrial America LLC, New Holland, PA (US)

(72) Inventor: Jason L. Shonk, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 208 days.

(21) Appl. No.: 16/598,513

(22) Filed: Oct. 10, 2019

(65) Prior Publication Data

US 2021/0105947 A1 Apr. 15, 2021

(51) Int. Cl.
| | | |
|---|---|---|
| *A01F 15/08* | (2006.01) | |
| *A01F 15/18* | (2006.01) | |
| *A01F 15/10* | (2006.01) | |
| *A01D 89/00* | (2006.01) | |

(52) U.S. Cl.
CPC ........ *A01F 15/0833* (2013.01); *A01D 89/003* (2013.01); *A01F 15/106* (2013.01); *A01F 15/18* (2013.01)

(58) Field of Classification Search
CPC .... A01F 15/0833; A01F 15/10; A01F 15/106; A01F 17/00; A01D 89/003
USPC .......................................................... 56/341
See application file for complete search history.

(56) References Cited

U.S. PATENT DOCUMENTS

| | | | |
|---|---|---|---|
| 4,319,446 A * | 3/1982 | Arnold | A01F 15/07 100/88 |
| 6,675,561 B2 * | 1/2004 | Davis | A01F 15/0715 100/4 |
| 6,874,412 B1 * | 4/2005 | Glaszcz | A01F 15/0833 100/47 |
| 7,204,074 B2 | 4/2007 | Bandstra et al. | |
| 7,913,482 B2 | 3/2011 | Olander et al. | |
| 8,056,314 B1 * | 11/2011 | Anstey | A01F 15/106 56/364 |
| 8,240,117 B1 * | 8/2012 | McClure | A01F 15/106 56/341 |
| 8,281,713 B2 | 10/2012 | Viaud | |
| 8,413,414 B2 * | 4/2013 | Herron | A01F 15/106 56/341 |

(Continued)

FOREIGN PATENT DOCUMENTS

EP 2 727 454 A1 5/2014

*Primary Examiner* — Alicia Torres
*Assistant Examiner* — Matthew Ian Neal
(74) *Attorney, Agent, or Firm* — Peter Zacharias; Patrick Sheldrake

(57) ABSTRACT

A pickup unit of an agricultural baler that includes a frame, at least one draper belt, at least one belt actuator operably connected to the at least one draper belt, a first auger and a second auger each being rotatably connected to the frame and located above the at least one draper belt, and a first and a second auger actuator respectively operably connected to the first and second auger. The pickup unit also includes an electrical processing circuit operably connected to and configured for adjusting the at least one belt actuator, the first auger actuator, and the second auger actuator so that a rotational speed of the at least one draper belt, the first auger, and/or the second auger is increased or decreased to evenly distribute the crop material as the crop material is transported to the bale chamber.

12 Claims, 4 Drawing Sheets

(56) References Cited

U.S. PATENT DOCUMENTS

| | | |
|---|---|---|
| 9,198,361 B2 | 12/2015 | Olander et al. |
| 2010/0242427 A1 | 9/2010 | Anstey et al. |
| 2012/0304612 A1* | 12/2012 | Roberge ................ A01F 15/106 56/341 |
| 2018/0249638 A1* | 9/2018 | Kraus ..................... A01F 15/10 |
| 2020/0000040 A1* | 1/2020 | Bruns ................ A01F 15/0705 |
| 2020/0187423 A1* | 6/2020 | Tacke ................... A01F 15/101 |

* cited by examiner

DRAPER PICKUP WITH CROP DISTRIBUTION FOR AGRICULTURAL BALER

BACKGROUND OF THE INVENTION

The present invention pertains to agricultural balers and, more specifically, to a pickup unit for an agricultural baler.

Agricultural harvesting machines, such as balers, are used to consolidate and package crop material so as to facilitate the storage and handling of the crop material for later use. In the case of hay or silage, a mower-conditioner is typically used to cut and condition the crop material. In the case of straw, an agricultural combine discharges non-grain crop material from the rear of the combine defining the straw (such as wheat or oat straw) which is to be picked up by the baler. The cut crop material is typically raked into a windrow, and a baler, such as a large square baler or round baler, straddles the windrows and travels along the windrows to pick up the crop material and form it into bales.

A round baler may generally include a frame, supported by wheels, a pickup unit to engage and lift the crop material into the baler, a cutting unit, a main bale chamber for forming a bale, and a wrapping mechanism for wrapping or tying a material around the bale after it has been formed in the main bale chamber. As the baler is towed over a windrow, the pickup unit lifts the crop material into the baler. Then, the crop material may be cut into smaller pieces by the cutting unit. As the crop material enters the main bale chamber, multiple carrier elements, e.g. rollers, chains and slats, and/or belts, will begin to roll a bale of hay within the chamber. These carrier elements are movable so that the chamber can initially contract and subsequently expand to maintain an appropriate amount of pressure on the periphery of the bale. After the bale is formed and wrapped by the wrapping mechanism, the rear of the baler is configured to open for allowing the bale to be discharged onto the field.

The pickup unit of a round baler may include a reel composed of tine bars and multiple tines attached to the tine bars for picking up the crop material from the field. The pickup unit may also include a driveline that is operably connected in between the power take off (PTO) shaft of the tractor, or other agricultural vehicle, and the tine bars. Thus, the driveline transmits the power from the PTO shaft in order to rotate the tine bars and tines attached thereto. During operation of the pickup unit, the amount of crop material supplied to the pickup unit may undesirably vary. For instance, an increase in speed, a cornering procedure, or on unevenly distributed windrow may cause a sudden increase or decrease in crop material lifted by the pickup unit and subsequently provided to the bale chamber. Thereby, reel may become underloaded, overloaded, or clogged and the bale chamber may undesirably form an uneven bale with a nonuniform density. Thus, the non-adjustable, rotating nature of the reel may undesirably impact the quality of the bale.

What is needed in the art is an efficient pickup unit for uniformly filling the bale chamber.

SUMMARY OF THE INVENTION

In one exemplary embodiment formed in accordance with the present invention, there is provided a pickup unit of an agricultural baler. The pickup unit includes a frame, at least one draper belt rotatably connected to the frame which has tines for lifting a crop material from a field, a pair of left and right augers, a drive system for driving the at least one draper belt and augers, sensors for sensing crop material within the bale chamber, and an electronic control unit. The electronic control unit adjusts the drive system, in response to the signals provided by the sensors, to accordingly increase or decrease the rotational speed of the at least one draper belt, left auger, and/or right auger for evenly distributing the crop mat within the frame of the pickup unit before it enters the bale chamber.

In another exemplary embodiment formed in accordance with the present invention, there is provided a pickup unit of an agricultural baler that has a bale chamber. The pickup unit includes a frame, at least one draper belt rotatably connected to the frame which has tines for lifting a crop material from a field, at least one belt actuator operably connected to the at least one draper belt, a first auger rotatably connected to the frame and located above the at least one draper belt, a second auger rotatably connected to the frame and located above the at least one draper belt, a first auger actuator operably connected to the first auger, and a second auger actuator operably connected to the second auger. The pickup unit also includes an electrical processing circuit operably connected to and configured for adjusting the at least one belt actuator, the first auger actuator, and the second auger actuator so that a rotational speed of at least one of the at least one draper belt, the first auger, and the second auger is one of increased and decreased to evenly distribute the crop material as the crop material is transported to the bale chamber.

In yet another exemplary embodiment formed in accordance with the present invention, there is provided an agricultural baler that includes a main frame, a bale chamber supported by the main frame and configured for forming a bale, and a pickup unit located upstream of the bale chamber and configured for picking up a crop material from a field. The pickup unit includes a frame, at least one draper belt rotatably connected to the frame which has tines for lifting the crop material from the field, at least one belt actuator operably connected to the at least one draper belt, a first auger rotatably connected to the frame and located above the at least one draper belt, a second auger rotatably connected to the frame and located above the at least one draper belt, a first auger actuator operably connected to the first auger, and a second auger actuator operably connected to the second auger. The agricultural baler also includes an electrical processing circuit operably connected to and configured for adjusting the at least one belt actuator, the first auger actuator, and the second auger actuator so that a rotational speed of at least one of the at least one draper belt, the first auger, and the second auger is one of increased and decreased to evenly distribute the crop material as the crop material is transported to the bale chamber.

In yet another exemplary embodiment formed in accordance with the present invention, there is provided a method for operating an agricultural baler which has a bale chamber. The method includes an initial step of providing a pickup unit for the agricultural baler. The pickup unit includes a frame, at least one draper belt rotatably connected to the frame which has tines for lifting a crop material from a field, at least one belt actuator operably connected to the at least one draper belt, a first auger rotatably connected to the frame and located above the at least one draper belt, a second auger rotatably connected to the frame and located above the at least one draper belt, a first auger actuator operably connected to the first auger, and a second auger actuator operably connected to the second auger. The pickup unit also includes an electrical processing circuit operably connected to the at least one belt actuator, the first auger actuator, and the second auger actuator. The method includes a further step of adjusting, by the electrical processing circuit, at least one of the at least one belt actuator, the first auger actuator, and the second auger actuator so that a rotational speed of at least one of the at least one draper belt, the first auger, and the second auger is one of increased and decreased to evenly distribute the crop material as the crop material is transported to the bale chamber.

One possible advantage of the exemplary embodiment of the agricultural baler is that the pickup unit improves the bale shape and density by evenly and uniformly distributing the crop material as it is picked up from the ground and transported to the bale chamber.

Another possible advantage of the exemplary embodiment of the agricultural baler is that the pickup unit improves operator drivability and comfort since the operator does not need to weave the agricultural baler left and right to evenly pickup crop material or repetitively look rearwardly while driving the towing vehicle to check the status of the agricultural baler.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural baler and/or components thereof are usually determined with reference to the direction of forward operative travel of the towing vehicle, but they should not be construed as limiting. The terms "longitudinal" and "transverse" are determined with reference to the fore-and-aft direction of the towing vehicle and are equally not to be construed as limiting.

Figure 1:
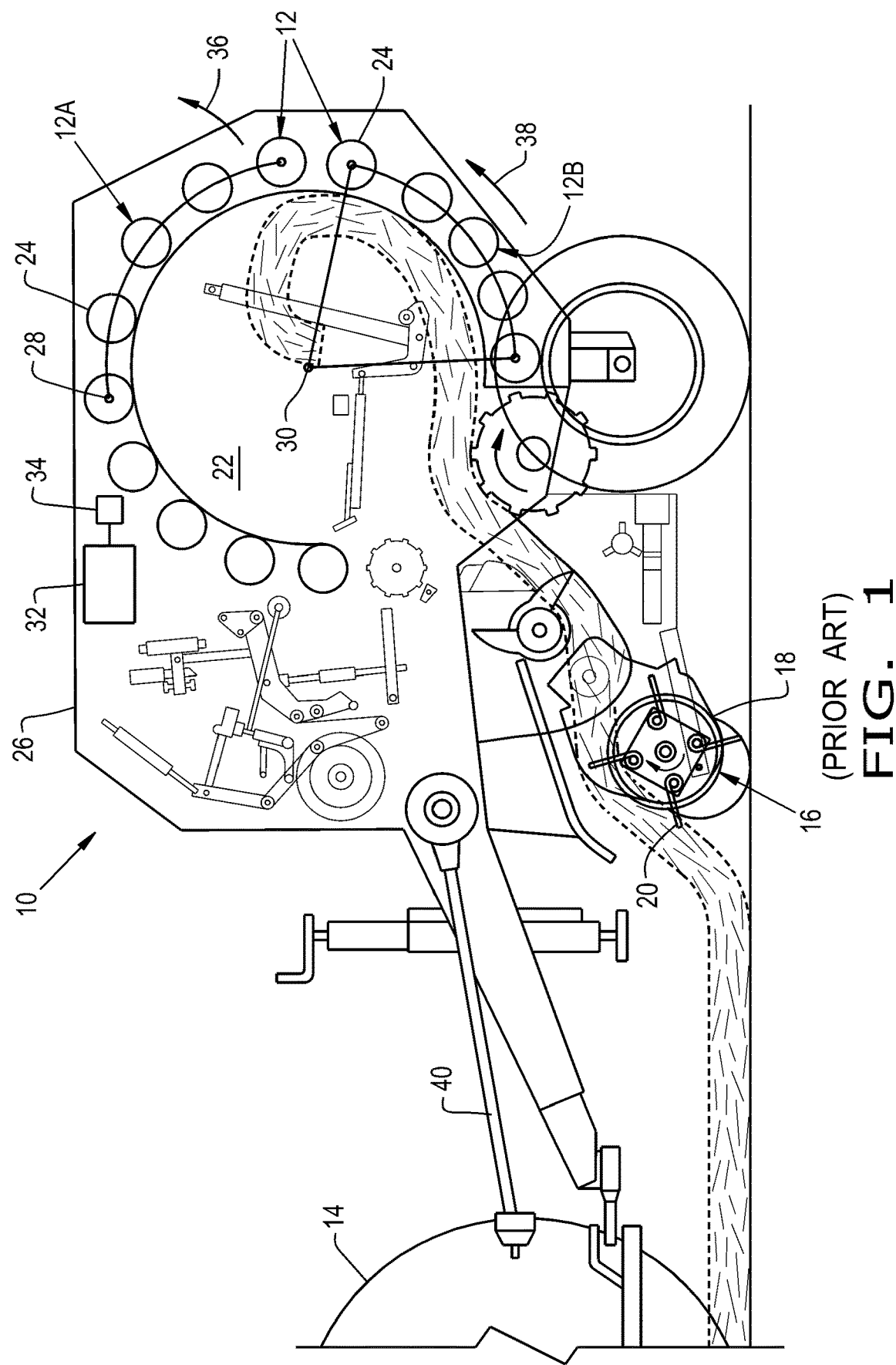
FIG. 1 illustrates a side cross-sectional view of a known agricultural baler that has a pickup unit and a bale chamber, the pickup unit has a rotating reel with tines.

Referring now to the drawings, and more particularly to FIG. 1, there is shown a cross-sectional, side view of a prior art round baler 10 which may be towed by an agricultural vehicle 14, such as a tractor 14. Alternatively, the round baler 10 may be a self-propelled baler.

Crop material is lifted from windrows into the baler 10 by a pickup unit 16. The pickup unit 16 includes a rotating pickup reel 18 with tine bars and tines 20, which move the crop rearward toward a bale chamber 22. The reel 18 is rotatable in an operating direction for lifting the crop material off of the ground and a reverse direction, i.e., opposite to the operating direction. In general, the crop material is rolled into a bale of a predetermined size within the bale chamber 22, and then is discharged through a tail gate arrangement 12 onto the field, where it is subsequently picked up for transport.

The bale chamber 22 is configured as an expandable bale chamber 22 with a plurality of carrier elements 24 carried by a frame 26. The carrier elements 24 are arranged in an arcuate arrangement around the bale chamber 22, and function to engage and roll the expanding bale as the crop material is fed into the bale chamber 22. In the illustrated embodiment, the carrier elements 24 are configured as rollers. However, the carrier elements can be variously formed, such as rollers, chains and slats, and/or belts.

The carrier elements 24 may be paired with an upper tail gate arrangement 12A and a lower tail gate arrangement 12B. The upper tail gate arrangement 12A has a first pivot axis 28, and the lower tail gate arrangement 12B has a second pivot axis 30. The upper and lower tail gate arrangements 12A, 12B may rotate to open the bale chamber 22 for accordingly allowing ejection of the wrapped bale.

The agricultural baler 10 can further include an electrical processing circuit 32 which is configured for carrying out a bale discharge operation using the upper tail gate arrangement 12A and the lower tail gate arrangement 12B. The electrical processing circuit 32 can carry out the bale discharge operation, based on the following discharge sequence. The electrical processing circuit 32 may first sense a full bale condition within the bale chamber 22 using an appropriate sensor 34, corresponding to a predetermined size of the bale within the bale chamber 22. Then the upper tail gate arrangement 12A may be opened by pivoting the upper tail gate arrangement 12A about the first pivot axis 28 to an open position (in an upward direction, as shown by directional arrow 36 in FIG. 1). Next, the bale may be ejected by pivoting the lower tail gate arrangement 12B about the second pivot axis 30 to an eject position (counter-clockwise in an upward direction, as shown by directional arrow 38 in FIG. 1). It should be appreciated that the electrical processing circuit 32 is coupled with suitable actuators (not shown), which are in turn coupled with the upper tail gate arrangement 12A and the lower tail gate arrangement 12B, for pivoting the upper tail gate arrangement 12A and the lower tail gate arrangement 12B about their respective pivot axis 28, 30. The discharge sequence can further include the step of wrapping the bale with a wrapping material (e.g., mesh or twine), after the full bale condition is sensed and prior to opening the upper tail gate arrangement 12A. To further decrease the bale discharge time, the upper tail gate arrangement 12A can be opened when the wrapping step is partially completed. In particular, the upper tail gate arrangement 12A can be opened when the bale has been wrapped with at least one full revolution of wrapping material.

Figure 2:
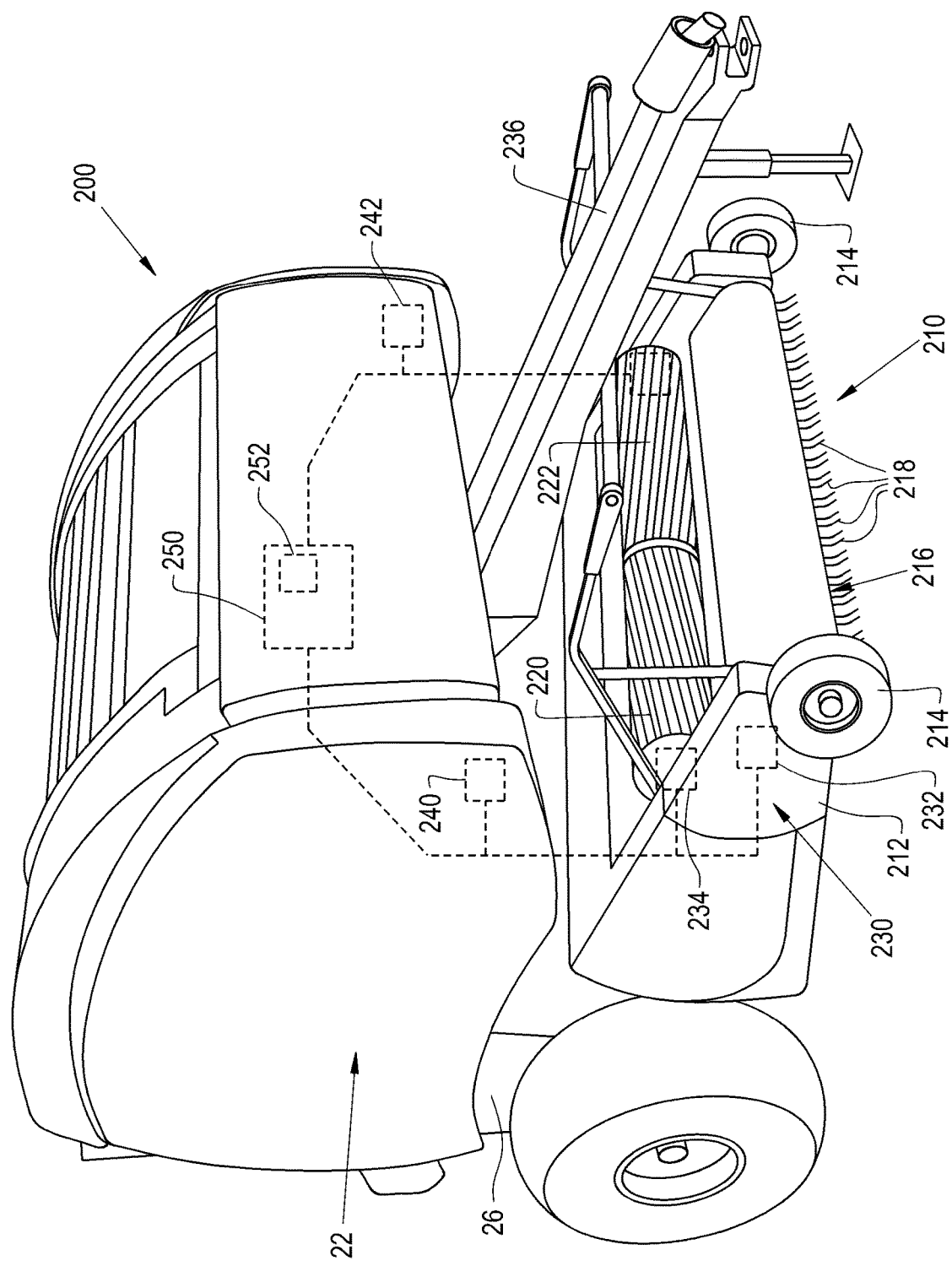
FIG. 2 illustrates a perspective view of an exemplary embodiment of an agricultural baler, which includes a draper-type pickup unit, in accordance with an exemplary embodiment of the present invention.

Referring now to FIG. 2, there is shown an exemplary embodiment of an agricultural baler 200 according to the present invention. The agricultural baler 200 may be similar to the agricultural baler 10 as the agricultural baler 200 may have a main frame 26 and a bale chamber 22. However, the agricultural baler 200 does not include a pickup unit 16, as discussed above, which has a reel 18 with tines, bands for separating the cop material from the reel tines, and a wind guard. Instead, the agricultural baler 200 includes a draper-type pickup unit 210 that more evenly and quickly feeds crop material into the bale chamber 22. Furthermore, the agricultural baler 200 includes a variable chamber, e.g.

variable belt chamber, as opposed to the fixed roller chamber 22 of the agricultural baler 10.

The pickup unit 210 generally includes a frame 212, gauge wheels 214 attached to the frame 212, one or more draper belts 216, a pair of left and right augers 220, 222, a drive system 230, one or more bale shape sensors 240, 242, and an electrical processing circuit 250 which adjusts the drive system 230 for accelerating and/or decelerating the draper belt 216 and augers 220, 222, independently or collectively, in order to evenly distribute the crop material within the frame 212 before it enters the bale chamber 22. It should be appreciated that the pickup unit 210 may be incorporated into any desired agricultural baler, such as a large square baler, a fixed chamber round baler, or a variable chamber round baler.

The one or more draper belts 216 are rotatably connected to the frame 212. As shown in FIG. 2, the pickup unit 210 includes only a single draper belt 216. Each draper belt 216 has tines 218 attached thereto for lifting the crop material from the field. The tines 218 may be in the form of any desired tines. Each draper belt 216 may further include various drive shafts, gears, chains, rollers, etc. for connecting to the drive system 230. The draper belts 216 may be in the form of endless belts and may comprise any desired material.

The left and right augers 220, 222 are rotatably connected to and supported by the frame 212. The augers 220, 222 are located above the draper belt 216. The augers 220, 222 are configured for replacing the wind guard of a typical agricultural baler 10. The augers 220, 222 may vary the downward force on the crop mat and further can be independently rotated at a desired rotational speed to move the crop leftward, rightward, or centrally within the frame 212. The augers 220, 222 may be in the form of variable pitch augers 220, 222 which are configured for being independently driven. However, the augers 220, 222 may be in the form of any desired augers and may comprise any desired material. The augers 220, 222 may include flighting or any other desired crop-engaging members. The augers 220, 222 may extend across at least a portion of the width of the frame 212. For instance, each auger 220, 222 may extend across the whole width of the frame and may accordingly be juxtaposed to one another. Alternatively, each auger 220, 222 may extend across approximately half of the width of the frame 212, and the augers 220, 222 may be coaxial with one another.

The drive system 230 generally includes one or more belt actuators 232 operably connected to the one or more draper belts 216 and a pair of auger actuators 234, 236 respectively operably connected to the augers 220, 222. Hence, the electrical processing circuit 250 may selectively control the rotational speed of the draper belt 216 and/or the augers 220, 222 via the drive system 230. The actuators 232, 234, 236 may be in the form of hydraulic and/or electric motors. For example, the belt actuator 232 may be a hydraulic motor 232 directly coupled with a drive shaft of the draper belt 216. Additionally, for example, the auger actuators 234, 236 may be in the form of hydraulic motors 234, 236 which are directly connected to an input shaft of the augers 220, 222. It should be appreciated that the actuators 232, 234, 236 may be adjusted individually or in tandem. Furthermore, it should be appreciated that the actuators 232, 234, 236 may be located on the frame 212, or on the frame 26 of the agricultural baler 200, at any desired location.

Each sensor 240, 242 may be in the form of a bale shape sensor 240, 242 for measuring an amount of crop material within the bale chamber 22. As shown, the pickup unit 210 includes a pair of left and right sensors 240, 242, located at each lateral side of the bale chamber 22, for measuring the amount of crop material at the left and right sides of the bale chamber 22. Each sensor 240, 242 provides a corresponding bale shape signal, e.g. a crop density and/or bale size signal, to the electrical processing circuit 250. The sensors 240, 242 may be in the form of any desired sensors for measuring the crop material, such as mechanical-pressure sensors, optical sensors, and/or radar sensors. It should be appreciated that the sensors 240, 242 may be incorporated as part of the pickup unit 210 or agricultural baler 200.

The electrical processing circuit 250 is operably connected, via a wired or wireless connection, to the actuators 232, 234, 236 and sensor(s) 240, 242. The electrical processing circuit 250 may be in the form of a controller 250 with a memory 252. It should be appreciated that the electrical processing circuit 250 may be part of the pickup unit 210, the agricultural baler 200, and/or the tractor 14. Furthermore, the electrical processing circuit 250 may be a separate controller or incorporated into existing hardware and/or software within the pickup unit 210, the agricultural baler 200, and/or the tractor 14. The electrical processing circuit 250 may also be operably connected to one or more crop sensors located outside of the bale chamber 22. For example, the electrical processing circuit 250 may receive crop data from a crop density sensor, e.g. a radar sensor, which is attached to the front of the agricultural baler 200, or tractor 14, for measuring the size and/or moisture content of the windrow. Furthermore, the electrical processing circuit 250 may be operably connected to a steering wheel angle sensor of the tractor 14, a speed sensor, a global positioning system (GPS) sensor, a yield map data source, and/or an inclinometer sensor of the agricultural vehicle 200 and/or tractor 14. Thereby, the electrical processing circuit 250 may accordingly speed up or slow down crop flow and/or adjust the lateral placement of the crop mat within the pickup unit 210 in response to the speed of the tractor 14, a cornering or turn operation of the tractor 14, and/or a particular location in the field.

In operation, the electrical processing circuit 250 may receive the bale shape signals provided by the bale shape sensor(s) 240, 242 and accordingly adjust one or more of the actuators 232, 324, 326 in order to increase or decrease the rotational speed of the draper belt(s) 216, the left auger 220, and/or right auger 222; thus, more evenly distributing the crop material within the pickup unit 210 before it enters the bale chamber 22. Hence, the lessor or greater amount of crop material, sensed by the sensors 240, 242 within the bale chamber 22, is accordingly corrected by supplying a greater or lessor amount of crop material to the left side, right side, and/or center of the frame 212. It should be appreciated that the electrical processing circuit 250 may automatically perform a method of measuring the crop material within the bale chamber 22 via the sensor(s) 240, 242, receiving the bale shape signals from the sensor(s) 240, 242, and adjusting the actuators 232, 234, 236 responsive to the bale shape signals to evenly distribute the crop material without any input from the operator. Thereby, the operator may not need to concern himself with adjusting various operating parameters while towing the agricultural baler 200. For instance, the operator may not need to slow down around or break up corners, zig-zag the agricultural side-to-side over the windrow, or otherwise look rearwardly to check on the crop flow of the agricultural baler 200.

Figure 3:
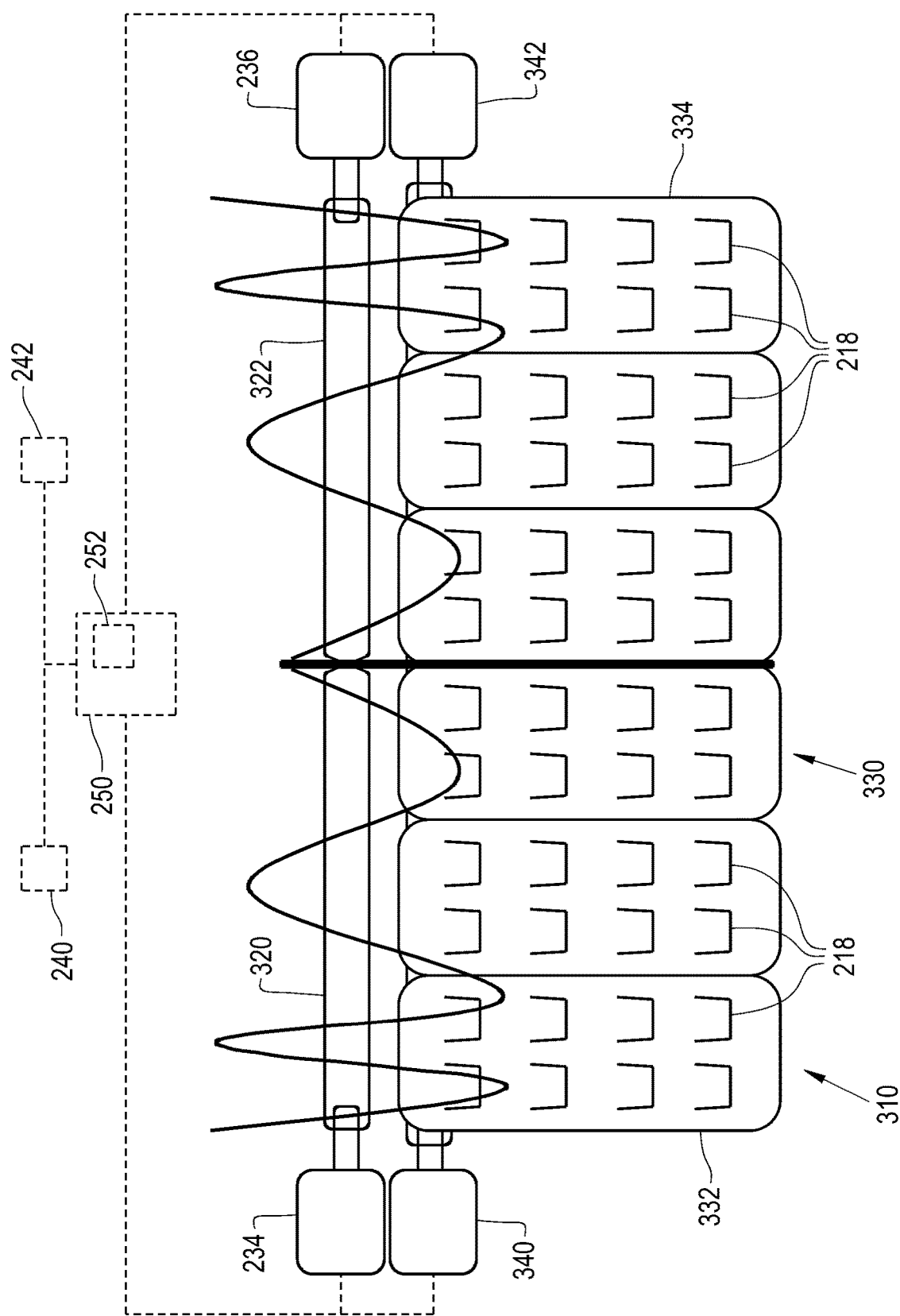
FIG. 3 illustrates a schematic view of another exemplary embodiment of a pickup unit for the agricultural baler of FIG. 2, in accordance with an exemplary embodiment of the present invention.

Referring now to FIG. 3, there is shown another exemplary embodiment of a pickup unit 310. The pickup unit 310 may be substantially similar to the pickup unit 210, as discussed above, except that the pickup unit 310 includes coaxial augers 320, 322, which each extend approximately halfway across the width of the frame 212, and a split draper belt 330. The split draper belt 330 has a left draper belt 332 and a right draper belt 334 which are independently driven by left and right belt actuators 340, 342, respectively. Like components have been identified with like reference characters.

Figure 4:
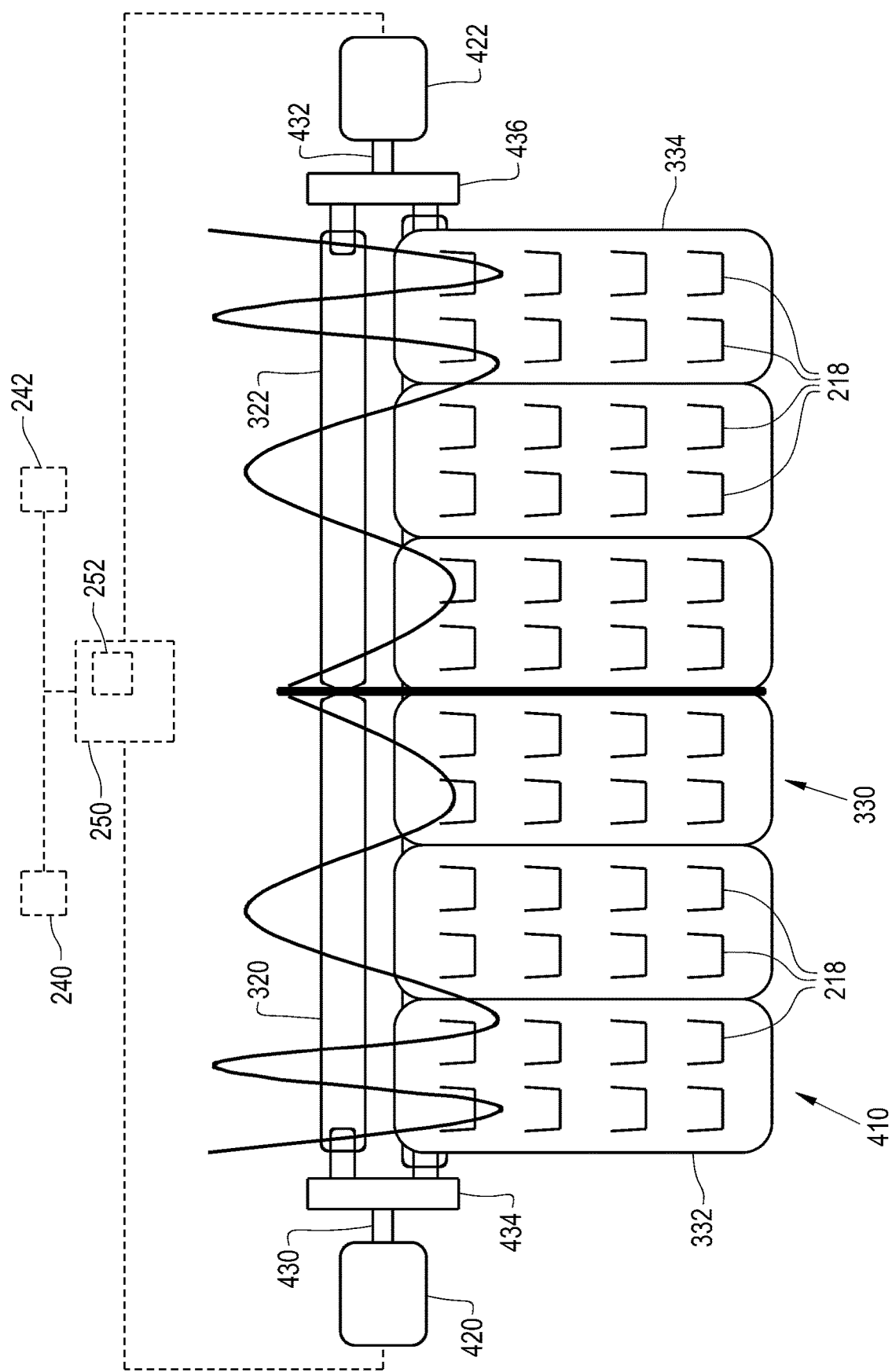
FIG. 4 illustrates a schematic view of another exemplary embodiment of a pickup unit for the agricultural baler of FIG. 2, in accordance with an exemplary embodiment of the present invention.

Referring now to FIG. 4, there is shown another exemplary embodiment of a pickup unit 410. The pickup unit 410 may be substantially similar to the pickup unit 310, as discussed above, except that the pickup unit 410 includes a single actuator 420, 422 for each left and right set of draper belts 332, 334 and augers 320, 322. For instance, the left actuator 420 is operably connected to the left draper belt 332 and the left auger 320, and the right actuator 422 is operably connected to the right draper belt 334 and the right auger 322. One or more shafts 430, 432 and conveying members 434, 436, e.g. belts or chains, may respectively connect the actuators 420, 422 to draper belts 332, 334 and augers 320, 322. In this regard, the left and right sets of draper belts 332, 334 and augers 320, 322 may be connected in tandem and may thus be proportionately adjusted. Like components have been identified with like reference characters.

It is to be understood that the operation of the pickup unit 210, 310, 410 may be performed by the electrical processing circuit 250, for example a controller 250, upon loading and executing software code or instructions which are tangibly stored on a tangible computer readable medium 252, such as on a magnetic medium, e.g., a computer hard drive, an optical medium, e.g., an optical disc, solid-state memory, e.g., flash memory, or other storage media known in the art. Thus, any of the functionality performed by the controller 250 described herein is implemented in software code or instructions which are tangibly stored on a tangible computer readable medium. The controller 250 loads the software code or instructions via a direct interface with the computer readable medium or via a wired and/or wireless network. Upon loading and executing such software code or instructions by the controller 250, the controller 250 may perform any of the functionality of the controller 250 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A pickup unit of an agricultural baler comprising a bale chamber, comprising:
a frame;
at least one draper belt rotatably connected to the frame and comprising tines for lifting a crop material from a field;
at least one belt actuator operably connected to the at least one draper belt a first auger rotatably connected to the frame and located above the at least one draper belt;
a second auger rotatably connected to the frame and located above the at least one draper belt;
a first auger actuator operably connected to the first auger;
a second auger actuator operably connected to the second auger; and
an electrical processing circuit operably connected to and configured for adjusting the at least one belt actuator, the first auger actuator, and the second auger actuator so that a rotational speed of at least one of the at least one draper belt, the first auger, and the second auger is one of increased and decreased to evenly distribute the crop material as the crop material is transported to the bale chamber;
wherein the at least one draper belt comprises a left draper belt and a right draper belt each being rotatably connected to the frame and comprising tines, and the left and right draper belts which are configured for being independently driven.

2. The pickup unit of claim 1, wherein the electrical processing circuit is configured for accelerating and decelerating the first and second auger actuators for distributing the crop material one of leftward, rightward, and centrally within the frame of the pickup unit before the crop material enters the bale chamber.

3. The pickup unit of claim 1, further comprising at least one bale shape sensor located within the bale chamber and operably connected to the electrical processing circuit, and the at least one bale shape sensor is configured for measuring an amount of crop material within the bale chamber and providing a corresponding bale shape signal to the electrical processing circuit such that the electrical processing circuit adjusts at least one of the at least one belt actuator, the first auger actuator, and the second auger actuator in response to the bale shape signal to evenly distribute the crop material.

4. The pickup unit of claim 3, wherein the at least one bale shape sensor comprises a left bale shape sensor and a right bale shape sensor for respectively measuring the amount of crop material at a left and right side of the bale chamber.

5. The pickup unit of claim 1, wherein the first and second augers are respectively in the form of first and second variable pitch augers which are configured for being independently driven.

6. The pickup unit of claim 1, wherein the at least one belt actuator comprises a left belt actuator and a right belt actuator respectively operably connected to the left draper belt and the right draper belt.

7. The pickup unit of claim 1, wherein the pickup unit does not include a reel with reel tines, bands for separating the crop material from the reel tines, and a wind guard.

8. The pickup unit of claim 1, further comprising:
an agricultural baler having:
a main frame;
a bale chamber supported by the main frame and configured for forming a bale;
wherein said pickup unit is located upstream of the bale chamber and configured for picking up a crop material from a field.

9. A method for operating an agricultural baler comprising a bale chamber, comprising:
   providing a pickup unit for the agricultural baler comprising a frame, at least one draper belt comprising a left draper belt and a right draper belt rotatably connected to the frame and which are configured for being independently driven and comprising tines for lifting a crop material from a field, at least one belt actuator operably connected to the at least one draper belt, a first auger rotatably connected to the frame and located above the at least one draper belt, a second auger rotatably connected to the frame and located above the at least one draper belt, a first auger actuator operably connected to the first auger, a second auger actuator operably connected to the second auger, and an electrical processing circuit operably connected to the at least one belt actuator, the first auger actuator, and the second auger actuator; and
   adjusting, by the electrical processing circuit, at least one of the at least one belt actuator, the first auger actuator, and the second auger actuator so that a rotational speed of at least one of the left draper belt and the right draper belt of at least one draper belt, the first auger, and the second auger is one of increased and decreased to evenly distribute the crop material as the crop material is transported to the bale chamber.

10. The method of claim 9, wherein the step of adjusting further comprises one of accelerating and decelerating, by the electrical processing circuit, the first and second auger actuators for distributing the crop material one of leftward, rightward, and centrally within the frame of the pickup unit before the crop material enters the bale chamber.

11. The method of claim 9, wherein the pickup unit further comprises at least one bale shape sensor located within the bale chamber and operably connected to the electrical processing circuit, and the method further comprises a step of measuring, by the at least one bale shape sensor, an amount of crop material within the bale chamber.

12. The method of claim 11, further comprising a step of providing, by the at least one bale shape sensor, a corresponding bale shape signal to the electrical processing circuit such that the electrical processing circuit adjusts at least one of the at least one belt actuator, the first auger actuator, and the second auger actuator in response to the bale shape signal to evenly distribute the crop material.

* * * * *